US011533859B2

(12) United States Patent
Schroeder et al.

(10) Patent No.: US 11,533,859 B2
(45) Date of Patent: Dec. 27, 2022

(54) HYDRATION SYSTEM FOR AN INDOOR GARDENING APPLIANCE

(71) Applicant: Haier US Appliance Solutions, Inc., Wilmington, DE (US)

(72) Inventors: Michael Goodman Schroeder, Louisville, KY (US); Matthew R. Hunter, Louisville, KY (US); Brian Michael Schork, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 564 days.

(21) Appl. No.: 16/681,951

(22) Filed: Nov. 13, 2019

(65) Prior Publication Data

US 2021/0137034 A1 May 13, 2021

(51) Int. Cl.
*A01G 25/16* (2006.01)
*A01G 25/02* (2006.01)
*A01G 9/02* (2018.01)

(52) U.S. Cl.
CPC ........... *A01G 25/165* (2013.01); *A01G 9/023* (2013.01); *A01G 25/023* (2013.01)

(58) Field of Classification Search
CPC .... A01G 25/16; A01G 25/165; A01G 25/023; A01G 9/023; A01G 31/06; A01G 31/02
See application file for complete search history.

(56) References Cited

U.S. PATENT DOCUMENTS

| 4,332,105 A | 6/1982 | Nir |
| 4,852,802 A | 8/1989 | Iggulden |
| 5,956,897 A * | 9/1999 | Takashima ............ A01G 31/00 47/60 |
| 7,832,142 B1 | 11/2010 | Olson |
| 8,869,447 B2 | 10/2014 | Benfey et al. |
| 8,910,419 B1 * | 12/2014 | Oberst .................... A01G 31/06 47/60 |
| 9,357,714 B2 | 6/2016 | Van Der Knaap et al. |
| 9,974,243 B2 * | 5/2018 | Martin .................... A01G 31/02 |
| 10,055,117 B2 | 8/2018 | Kim et al. |
| 11,039,585 B1 * | 6/2021 | Huntzinger ............ A01G 31/06 |
| 11,304,391 B1 * | 4/2022 | DeJong .................. A01G 7/045 |
| 11,343,976 B2 * | 5/2022 | Hunter .................. G01B 17/00 |
| 2014/0053463 A1 * | 2/2014 | Khaled .................. A01G 31/06 47/61 |
| 2014/0115958 A1 * | 5/2014 | Helene ..................... A01G 9/24 47/17 |

(Continued)

FOREIGN PATENT DOCUMENTS

| CN | 103704063 A * | 4/2014 | ............ A01G 7/045 |
| CN | 105519424 A | 4/2016 | |

(Continued)

*Primary Examiner* — Monica L Perry
*Assistant Examiner* — Aaron M Rodziwicz
(74) *Attorney, Agent, or Firm* — Dority & Manning, P.A.

(57) ABSTRACT

A hydration system for an indoor gardening appliance includes a pressurized water supply including a pump assembly for pressurizing an accumulator and an auxiliary nozzle in fluid communication with the pressurized water supply. An auxiliary valve assembly is operably coupled to the auxiliary nozzle for selectively directing an auxiliary flow of water from the accumulator onto the plant pods when power is lost to the gardening appliance.

19 Claims, 10 Drawing Sheets

(56) References Cited

U.S. PATENT DOCUMENTS

| | | | |
|---|---|---|---|
| 2014/0259919 A1* | 9/2014 | Halmos | A01G 31/02 47/62 C |
| 2015/0289463 A1 | 10/2015 | Moriarty | |
| 2016/0029574 A1* | 2/2016 | He | A01G 9/023 47/66.5 |
| 2016/0044879 A1* | 2/2016 | Hamlin | A01G 31/02 47/62 R |
| 2017/0094920 A1* | 4/2017 | Ellins | A01G 31/02 |
| 2017/0265408 A1* | 9/2017 | McGowan | A01G 31/02 |
| 2017/0347547 A1* | 12/2017 | Lu | A01G 31/02 |
| 2018/0014475 A1* | 1/2018 | Gomi | A01G 7/045 |
| 2018/0343812 A1* | 12/2018 | Leo | A01G 9/249 |
| 2018/0364987 A1* | 12/2018 | Millar | G06F 11/3688 |
| 2018/0365137 A1* | 12/2018 | Millar | A01G 31/02 |
| 2019/0029201 A1 | 1/2019 | Griffin | |
| 2019/0075741 A1* | 3/2019 | Olesen | A01G 31/06 |
| 2019/0082612 A1* | 3/2019 | Bitetti | A01G 7/045 |
| 2019/0082620 A1* | 3/2019 | Griffin | A01G 9/247 |
| 2019/0114935 A1 | 4/2019 | Nolan et al. | |
| 2019/0124865 A1* | 5/2019 | Sunnen | A01G 7/02 |
| 2019/0166777 A1 | 6/2019 | Barker et al. | |
| 2019/0191639 A1* | 6/2019 | Hegyi | A01G 9/20 |
| 2019/0208711 A1* | 7/2019 | Sahu | A01G 9/023 |
| 2019/0216029 A1* | 7/2019 | Wilcox | A01G 9/022 |
| 2020/0029508 A1* | 1/2020 | Vazquez Losada | A01G 9/249 |
| 2020/0037514 A1* | 2/2020 | Massey | A01G 9/247 |
| 2020/0037526 A1* | 2/2020 | Sperry | A01G 9/025 |
| 2020/0100444 A1* | 4/2020 | Lu | A01G 31/02 |
| 2020/0137964 A1* | 5/2020 | Bouchard | H04W 4/80 |
| 2020/0170205 A1* | 6/2020 | Zamir | A01G 27/001 |
| 2020/0260659 A1* | 8/2020 | Lee | A01G 9/249 |
| 2020/0260665 A1* | 8/2020 | Yi | A01G 9/249 |
| 2020/0260668 A1* | 8/2020 | Choi | F25D 23/006 |
| 2020/0260669 A1* | 8/2020 | Kim | A01G 31/06 |
| 2020/0323157 A1* | 10/2020 | English | A01G 7/00 |
| 2021/0112728 A1* | 4/2021 | Fonseca dos Reis | A01G 27/003 |
| 2021/0144942 A1* | 5/2021 | Ofir | A01G 7/045 |
| 2021/0161091 A1* | 6/2021 | Tyink | A01G 31/06 |
| 2021/0185936 A1* | 6/2021 | Ando | H05B 47/16 |
| 2021/0204489 A1* | 7/2021 | Choi | A01G 9/249 |
| 2021/0204499 A1* | 7/2021 | Fujisawa | A01G 9/249 |
| 2021/0212270 A1* | 7/2021 | Booker-Ogunde | A01G 31/06 |
| 2022/0000043 A1* | 1/2022 | Coffin | B25J 9/06 |
| 2022/0000045 A1* | 1/2022 | Hässler-Maraun | A01G 9/249 |
| 2022/0007599 A1* | 1/2022 | Lim | A01G 27/005 |
| 2022/0061242 A1* | 3/2022 | Sperry | A01G 31/06 |
| 2022/0132760 A1* | 5/2022 | Wilcox | A01G 31/02 47/62 A |

FOREIGN PATENT DOCUMENTS

| | | | | |
|---|---|---|---|---|
| CN | 205756216 U | | 12/2016 | |
| CN | 206165391 U | | 5/2017 | |
| CN | 108651075 A | | 10/2018 | |
| CN | 111194688 A | * | 5/2020 | A01G 24/15 |
| EP | 3251499 A1 | * | 12/2017 | A01G 31/02 |
| EP | 3653043 A1 | * | 5/2020 | A01G 27/003 |
| JP | 2012085586 A | | 5/2012 | |
| KR | 20120094184 A | * | 8/2012 | |
| KR | 20130089393 A | * | 8/2013 | |
| KR | 1801516 B1 | * | 11/2017 | A01G 31/06 |
| KR | 101954237 B1 | | 3/2019 | |
| KR | 2020025855 A | * | 3/2020 | A01C 1/02 |
| KR | 2020058040 A | * | 5/2020 | A01G 27/003 |
| RU | 2061371 C1 | | 6/1996 | |
| RU | 2127874 C1 | | 3/1999 | |
| WO | WO2012100482 A1 | | 8/2012 | |
| WO | WO-2013108332 A1 | * | 7/2013 | A01G 31/02 |
| WO | WO-2015001763 A1 | * | 1/2015 | A01G 31/02 |
| WO | WO-2015123725 A1 | * | 8/2015 | A01G 31/02 |
| WO | WO-2015140820 A1 | * | 9/2015 | A01G 29/00 |
| WO | WO-2016164652 A1 | * | 10/2016 | A01G 31/00 |
| WO | WO2018068042 A1 | | 4/2018 | |
| WO | WO2018158093 A1 | | 9/2018 | |
| WO | WO-2020047008 A1 | * | 3/2020 | A01G 22/00 |
| WO | WO-2020142851 A1 | * | 7/2020 | A01G 31/02 |
| WO | WO-2020201214 A1 | * | 10/2020 | A01G 31/06 |
| WO | WO-2021080139 A1 | * | 4/2021 | |

* cited by examiner

HYDRATION SYSTEM FOR AN INDOOR GARDENING APPLIANCE

FIELD OF THE INVENTION

The present subject matter relates generally to systems for gardening plants indoors, and more particularly, to systems and methods for hydrating plants within an indoor gardening appliance.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Conventional indoor gardens centers typically include a hydration system for providing a flow of water and nutrients onto plants stored therein to facilitate plant growth. For example, typical garden centers have a nozzle that sprays water onto roots within a root chamber of a grow module or otherwise charges the entire root chamber with a hydrating mist. However, such hydration systems typically require a constant power supply to energize a pump assembly for urging the flow of water. As a result, in the event of a power outage, pump failure, of other water supply issue, plants stored within the gardening appliance may go without critical hydration, resulting in plants dying or deteriorating.

Accordingly, an improved indoor garden center would be useful. More particularly, an indoor garden center with a hydration system that facilitates constant hydration even in the event of a power outage or pump failure would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance is provided including a liner positioned within a cabinet and defining a grow chamber, a grow module mounted within the liner and defining a root chamber, a plurality of apertures defined through the grow module for receiving one or more plant pods that extend into the root chamber, and a hydration system. The hydration system includes a pressurized water supply, an auxiliary nozzle in fluid communication with the pressurized water supply, and an auxiliary valve assembly operably coupled to the auxiliary nozzle for selectively directing an auxiliary flow of water from the pressurized water supply onto the plant pods when power is lost to the gardening appliance.

In another exemplary embodiment, a hydration system for a gardening appliance is provided. The gardening appliance includes a grow module defining a plurality of apertures for receiving plant pods. The hydration system includes a pressurized water supply, an auxiliary nozzle in fluid communication with the pressurized water supply, and an auxiliary valve assembly operably coupled to the auxiliary nozzle for selectively directing an auxiliary flow of water from the pressurized water supply onto the plant pods when power is lost to the gardening appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
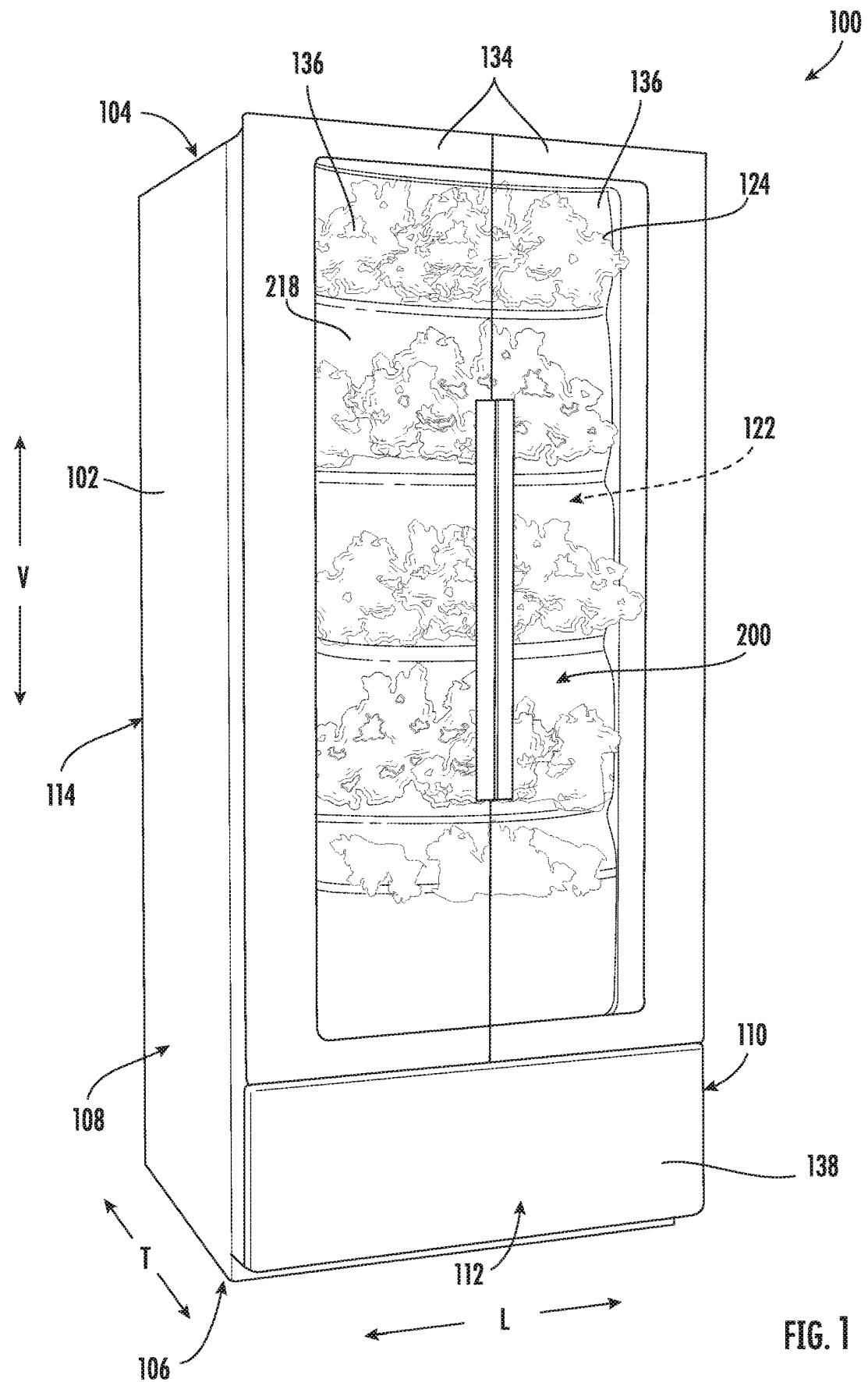
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "approximately," "substantially," or "about," refer to being within a ten percent (10%) margin of error of the stated value. Moreover, as used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

FIG. 1 provides a front view of a gardening appliance 100 according to an exemplary embodiment of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

Gardening appliance 100 includes a housing or cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

Gardening appliance 100 may include an insulated liner 120 positioned within cabinet 102. Liner 120 may at least partially define a temperature controlled, referred to herein generally as a grow chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter.

Cabinet 102, or more specifically, liner 120 may define a substantially enclosed back region or portion 130. In addition, cabinet 102 and liner 120 may define a front opening, referred to herein as front display opening 132, through which a user of gardening appliance 100 may access grow chamber 122, e.g., for harvesting, planting, pruning, or otherwise interacting with plants 124. According to an exemplary embodiment, enclosed back portion 130 may be defined as a portion of liner 120 that defines grow chamber 122 proximate rear side 114 of cabinet 102. In addition, front display opening 132 may generally be positioned proximate or coincide with front side 112 of cabinet 102.

Figure 2:
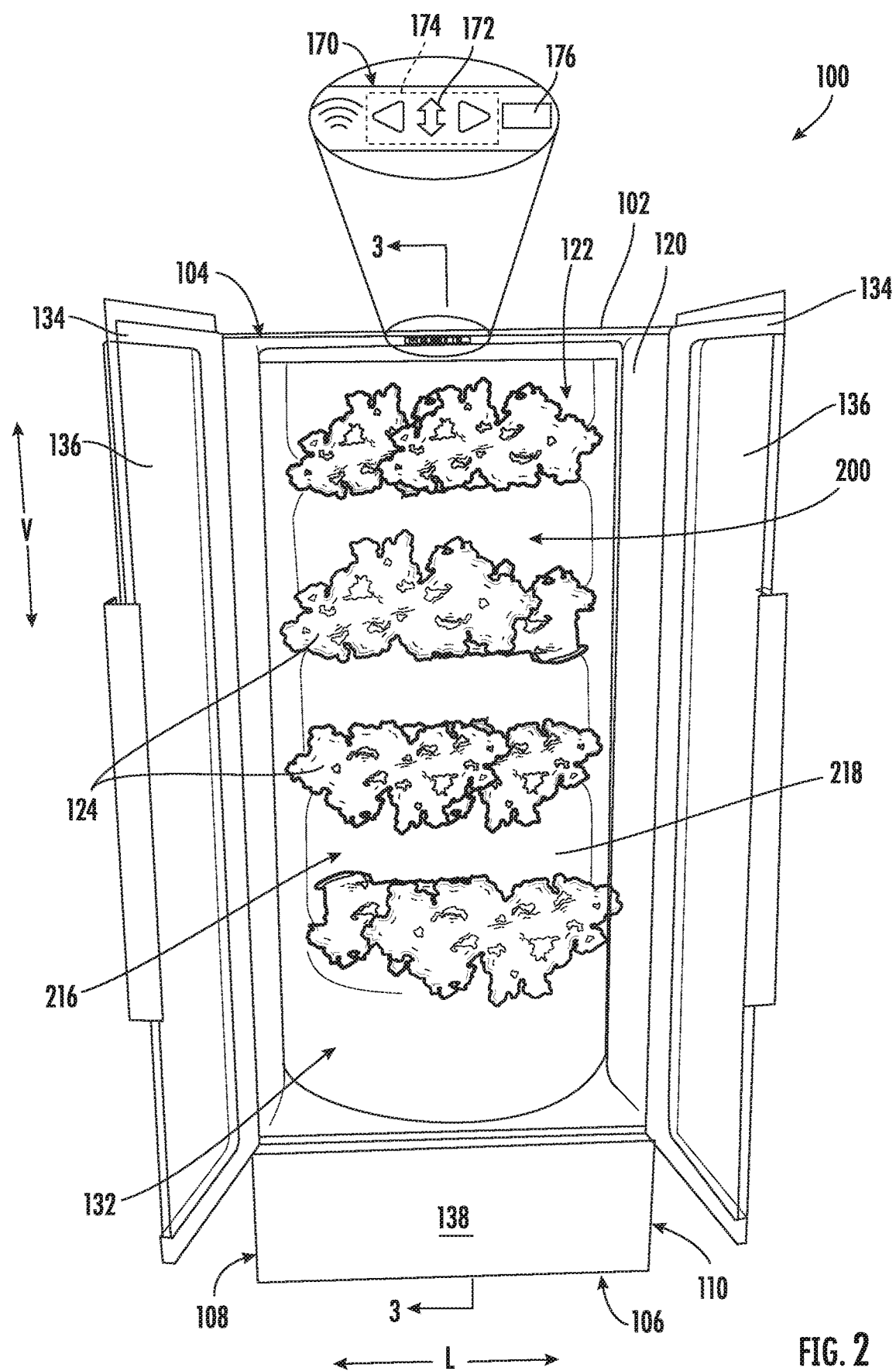
FIG. 2 depicts a front view of the exemplary gardening appliance of FIG. 1 with the doors open according to an exemplary embodiment of the present subject matter.

Gardening appliance 100 may further include one or more doors 134 that are rotatably mounted to cabinet 102 for providing selective access to grow chamber 122. For example, FIG. 1 illustrates doors 134 in the closed position such that they may help insulate grow chamber 122. By contrast, FIG. 2 illustrates doors 134 in the open positioned for accessing grow chamber 122 and plants 124 stored therein. Doors 134 may further include a transparent window 136 through which a user may observe plants 124 without opening doors 134.

Although doors 134 are illustrated as being rectangular and being mounted on front side 112 of cabinet 102 in FIGS. 1 and 2, it should be appreciated that according to alternative embodiments, doors 134 may have different shapes, mounting locations, etc. For example, doors 134 may be curved, may be formed entirely from glass, etc. In addition, doors 134 may have integral features for controlling light passing into and/or out of grow chamber 122, such as internal louvers, tinting, UV treatments, polarization, etc. One skilled in the art will appreciate that other chamber and door configurations are possible and within the scope of the present invention.

According to the illustrated embodiment, cabinet 102 further defines a drawer 138 positioned proximate bottom 106 of cabinet 102 and being slidably mounted to cabinet for providing convenient storage for plant nutrients, system accessories, water filters, etc. In addition, behind drawer 138 is a mechanical compartment 140 for receipt of an environmental control system including a sealed system for regulating the temperature within grow chamber 122, as described in more detail below.

Figure 3:
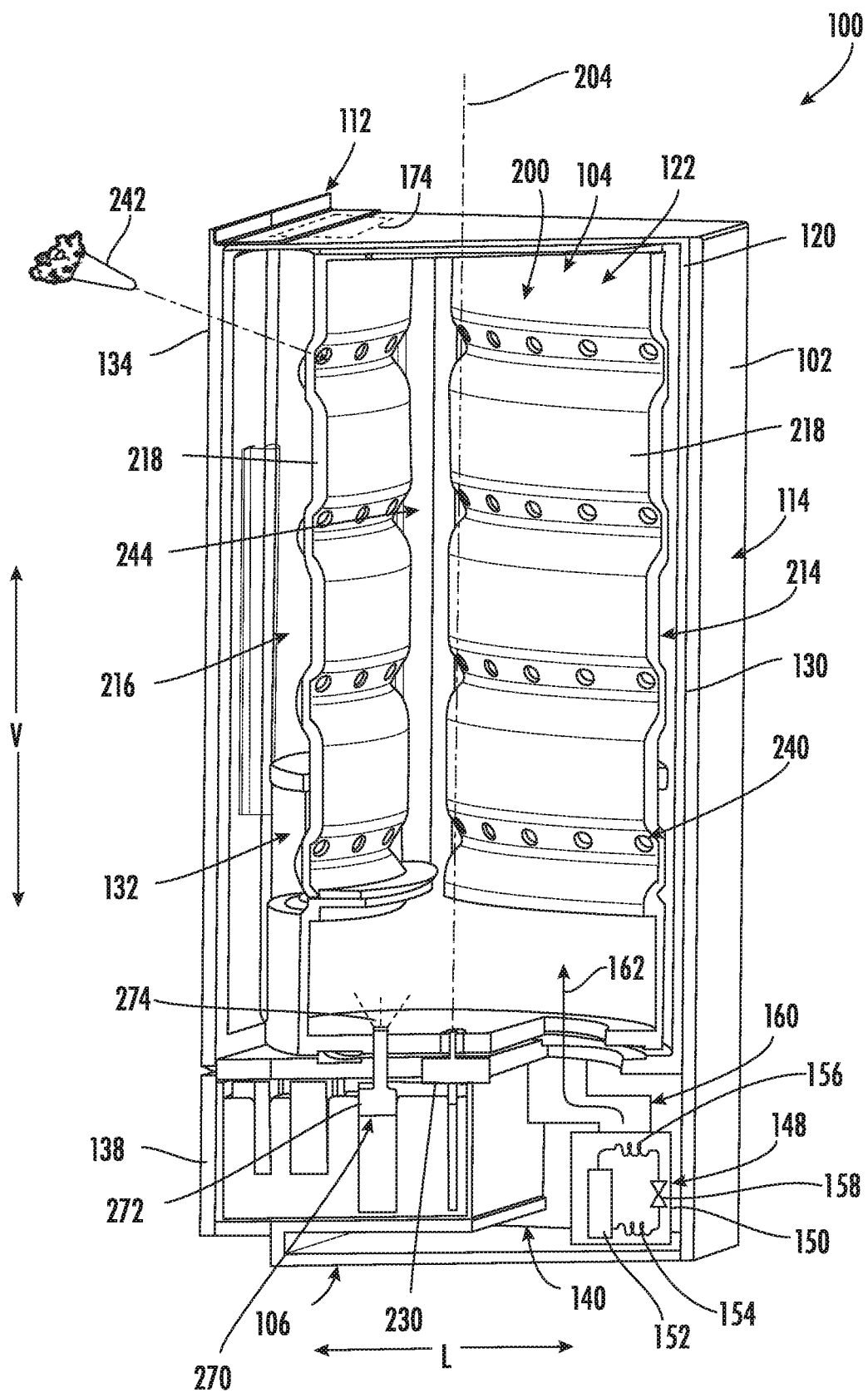
FIG. 3 is a cross sectional view of the exemplary gardening appliance of FIG. 1, taken along Line 3-3 from FIG. 2 with an internal divider removed for clarity.

FIG. 3 provides a schematic view of certain components of an environmental control system 148 that may be used to regulate a temperature within grow chamber 122. Specifically, environmental control system 148 may include a sealed system 150, a duct system 160, and a hydration system 270, or any other suitable components or subsystems for regulating an environment within grow chamber 122, e.g., for facilitating improved or regulated growth of plants 124 positioned therein. Specifically, FIG. 3 illustrates sealed system 150 within mechanical compartment 140. Although an exemplary sealed system is illustrated and described herein, it should be appreciated that variations and modifications may be made to sealed system 150 while remaining within the scope of the present subject matter. For example, sealed system 150 may include additional or alternative components, different ducting configurations, etc.

As shown, sealed system 150 includes a compressor 152, a first heat exchanger or evaporator 154 and a second heat exchanger or condenser 156. As is generally understood, compressor 152 is generally operable to circulate or urge a flow of refrigerant through sealed system 150, which may include various conduits which may be utilized to flow refrigerant between the various components of sealed system 150. Thus, evaporator 154 and condenser 156 may be between and in fluid communication with each other and compressor 152.

During operation of sealed system 150, refrigerant flows from evaporator 154 and to compressor 152, and compressor 152 is generally configured to direct compressed refrigerant from compressor 152 to condenser 156. For example, refrigerant may exit evaporator 154 as a fluid in the form of a superheated vapor. Upon exiting evaporator 154, the refrigerant may enter compressor 152, which is operable to compress the refrigerant. Accordingly, the pressure and temperature of the refrigerant may be increased in compressor 152 such that the refrigerant becomes a more superheated vapor.

Condenser 156 is disposed downstream of compressor 152 and is operable to reject heat from the refrigerant. For example, the superheated vapor from compressor 152 may enter condenser 156 and transfer energy to air surrounding condenser 156 (e.g., to create a flow of heated air). In this manner, the refrigerant condenses into a saturated liquid and/or liquid vapor mixture. A condenser fan (not shown) may be positioned adjacent condenser 156 and may facilitate or urge the flow of heated air across the coils of condenser 156 (e.g., from ambient atmosphere) in order to facilitate heat transfer.

According to the illustrated embodiment, an expansion device or a variable electronic expansion valve 158 may be further provided to regulate refrigerant expansion. During use, variable electronic expansion valve 158 may generally expand the refrigerant, lowering the pressure and temperature thereof. In this regard, refrigerant may exit condenser 156 in the form of high liquid quality/saturated liquid vapor mixture and travel through variable electronic expansion valve 158 before flowing through evaporator 154. Variable electronic expansion valve 158 is generally configured to be adjustable, e.g., such that the flow of refrigerant (e.g., volumetric flow rate in milliliters per second) through variable electronic expansion valve 158 may be selectively varied or adjusted.

Evaporator 154 is disposed downstream of variable electronic expansion valve 158 and is operable to heat refrigerant within evaporator 154, e.g., by absorbing thermal energy from air surrounding the evaporator (e.g., to create a flow of cooled air). For example, the liquid or liquid vapor mixture refrigerant from variable electronic expansion valve 158 may enter evaporator 154. Within evaporator 154, the refrigerant from variable electronic expansion valve 158 receives energy from the flow of cooled air and vaporizes into superheated vapor and/or high quality vapor mixture. An air handler or evaporator fan (not shown) is positioned adjacent evaporator 154 and may facilitate or urge the flow of cooled air across evaporator 154 in order to facilitate heat transfer. From evaporator 154, refrigerant may return to compressor 152 and the vapor-compression cycle may continue.

As explained above, environmental control system 148 includes a sealed system 150 for providing a flow of heated air or a flow cooled air throughout grow chamber 122 as needed. To direct this air, environmental control system 148 includes a duct system 160 for directing the flow of temperature regulated air, identified herein simply as flow of air 162 (see, e.g., FIG. 3). In this regard, for example, an evaporator fan can generate a flow of cooled air as the air passes over evaporator 154 and a condenser fan can generate a flow of heated air as the air passes over condenser 156.

These flows of air 162 are routed through a cooled air supply duct and/or a heated air supply duct (not shown), respectively. In this regard, it should be appreciated that environmental control system 148 may generally include a plurality of ducts, dampers, diverter assemblies, and/or air handlers to facilitate operation in a cooling mode, in a heating mode, in both a heating and cooling mode, or any other mode suitable for regulating the environment within grow chamber 122. It should be appreciated that duct system 160 may vary in complexity and may regulate the flows of air from sealed system 150 in any suitable arrangement through any suitable portion of grow chamber 122.

Gardening appliance 100 may include a control panel 170. Control panel 170 includes one or more input selectors 172, such as e.g., knobs, buttons, push buttons, touchscreen interfaces, etc. In addition, input selectors 172 may be used to specify or set various settings of gardening appliance 100, such as e.g., settings associated with operation of sealed system 150. Input selectors 172 may be in communication with a processing device or controller 174. Control signals generated in or by controller 174 operate gardening appliance 100 in response to input selectors 172. Additionally, control panel 170 may include a display 176, such as an indicator light or a screen. Display 176 is communicatively coupled with controller 174 and may display information in response to signals from controller 174. Further, as will be described herein, controller 174 may be communicatively coupled with other components of gardening appliance 100, such as e.g., one or more sensors, motors, or other components.

As used herein, "processing device" or "controller" may refer to one or more microprocessors or semiconductor devices and is not restricted necessarily to a single element. The processing device can be programmed to operate gardening appliance 100. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations.

Referring now generally to FIGS. 1 through 8, gardening appliance 100 generally includes a rotatable carousel, referred to herein as a grow module 200 that is mounted within liner 120, e.g., such that it is within grow chamber 122. As illustrated, grow module 200 includes a central hub 202 that extends along and is rotatable about a central axis 204. Specifically, according to the illustrated embodiment, central axis 204 is parallel to the vertical direction V. However, it should be appreciated that central axis 204 could alternatively extend in any suitable direction, e.g., such as the horizontal direction. In this regard, grow module 200 generally defines an axial direction, i.e., parallel to central axis 204, a radial direction R that extends perpendicular to central axis 204, and a circumferential direction C that extends around central axis 204 (e.g. in a plane perpendicular to central axis 204).

Grow module 200 may further include a plurality of partitions 206 that extend from central hub 202 substantially along the radial direction R. In this manner, grow module 200 defines a plurality of chambers, referred to herein generally by reference numeral 210, by dividing or partitioning grow chamber 122. Referring specifically to a first embodiment of grow module 200 illustrated in FIGS. 1 through 8, grow module 200 includes three partitions 206 to define a first chamber 212, a second chamber 214, and a third chamber 216, which are circumferentially spaced relative to each other. In general, as grow module 200 is rotated within grow chamber 122, the plurality of chambers 210 define substantially separate and distinct growing environments, e.g., for growing plants 124 having different growth needs.

More specifically, partitions 206 may extend from central hub 202 to a location immediately adjacent liner 120. Although partitions 206 are described as extending along the radial direction, it should be appreciated that they need not be entirely radially extending. For example, according to the illustrated embodiment, the distal ends of each partition is joined with an adjacent partition using an arcuate wall 218, which is generally used to support plants 124.

Notably, it is desirable according to exemplary embodiments to form a substantial seal between partitions 206 and liner 120. Therefore, according to an exemplary embodiment, grow module 200 may define a grow module diameter 220 (e.g., defined by its substantially circular footprint formed in a horizontal plane). Similarly, enclosed back portion 130 of liner 120 may be substantially cylindrical and may define a liner diameter 222. In order to prevent a significant amount of air from escaping between partitions 206 and liner 120, liner diameter 222 may be substantially equal to or slightly larger than grow module diameter 220.

According to still other embodiments, grow module 200 may include one or more sealing elements 224 positioned on a radially distal end of each of partitions 206. In this regard, sealing elements 224 may extend from partitions 206 toward liner 120 to contact and seal against liner 120. For example, according to the illustrated embodiment, sealing elements 224 are wiper blades formed from silicone or another suitably resilient material. Thus, as grow module 200 rotates, sealing elements 224 slide against liner 120 to substantially seal each of the plurality of chambers 210. It should be appreciated that as used herein, the term "substantial seal" and the like is not intended to refer to a perfectly airtight junction. Instead, this term is generally used to refer to an environment which may be regulated independently of adjacent environments to a reasonable degree. For example, if plants 124 and the first chamber 212 prefer a 10° F. increase in temperature relative to plants 124 and second chamber 214, the substantial seal between these two chambers may facilitate such temperature difference.

Referring now specifically to FIG. 3, gardening appliance 100 may further include a motor 230 or another suitable driving element or device for selectively rotating grow module 200 during operation of gardening appliance 100. In this regard, according to the illustrated embodiment, motor 230 is positioned below grow module 200, e.g., within mechanical compartment 140, and is operably coupled to grow module 200 along central axis 204 for rotating grow module 200.

As used herein, "motor" may refer to any suitable drive motor and/or transmission assembly for rotating grow module 200. For example, motor 230 may be a brushless DC electric motor, a stepper motor, or any other suitable type or configuration of motor. For example, motor 230 may be an AC motor, an induction motor, a permanent magnet synchronous motor, or any other suitable type of AC motor. In addition, motor 230 may include any suitable transmission assemblies, clutch mechanisms, or other components.

According to an exemplary embodiment, motor 230 may be operably coupled to controller 174, which is programmed to rotate grow module 200 according to predetermined operating cycles, based on user inputs (e.g. via touch buttons 172), etc. In addition, controller 174 may be communicatively coupled to one or more sensors, such as temperature or humidity sensors, positioned within the various chambers 210 for measuring temperatures and/or humidity, respectively. Controller 174 may then operate motor 230 in order to maintain desired environmental conditions for each of the respective chambers 210. For example, as will be described in more detail below, gardening appliance 100 includes features for providing certain locations of gardening appliance 100 with light, temperature control, proper moisture, nutrients, and other requirements for suitable plant growth. Motor 230 may be used to position specific chambers 210 where needed to receive such growth requirements.

According to an exemplary embodiment, such as where three partitions 206 form three chambers 212-216, controller 174 may operate motor 230 to index grow module 200 sequentially through a number of preselected positions. More specifically, motor 230 may rotate grow module 200 in a counterclockwise direction (e.g. when viewed from a top of grow module 200) in 120° increments to move chambers 210 between sealed positions and display positions. As used herein, a chamber 210 is considered to be in a "sealed position" when that chamber 210 is substantially sealed between grow module 200 (i.e., central hub 202 and adjacent partitions 206) and liner 120. By contrast, a chamber 210 is considered to be in a "display position" when that chamber 210 is at least partially exposed to front display opening 132, such that a user may access plants 124 positioned within that chamber 210.

Figure 4:
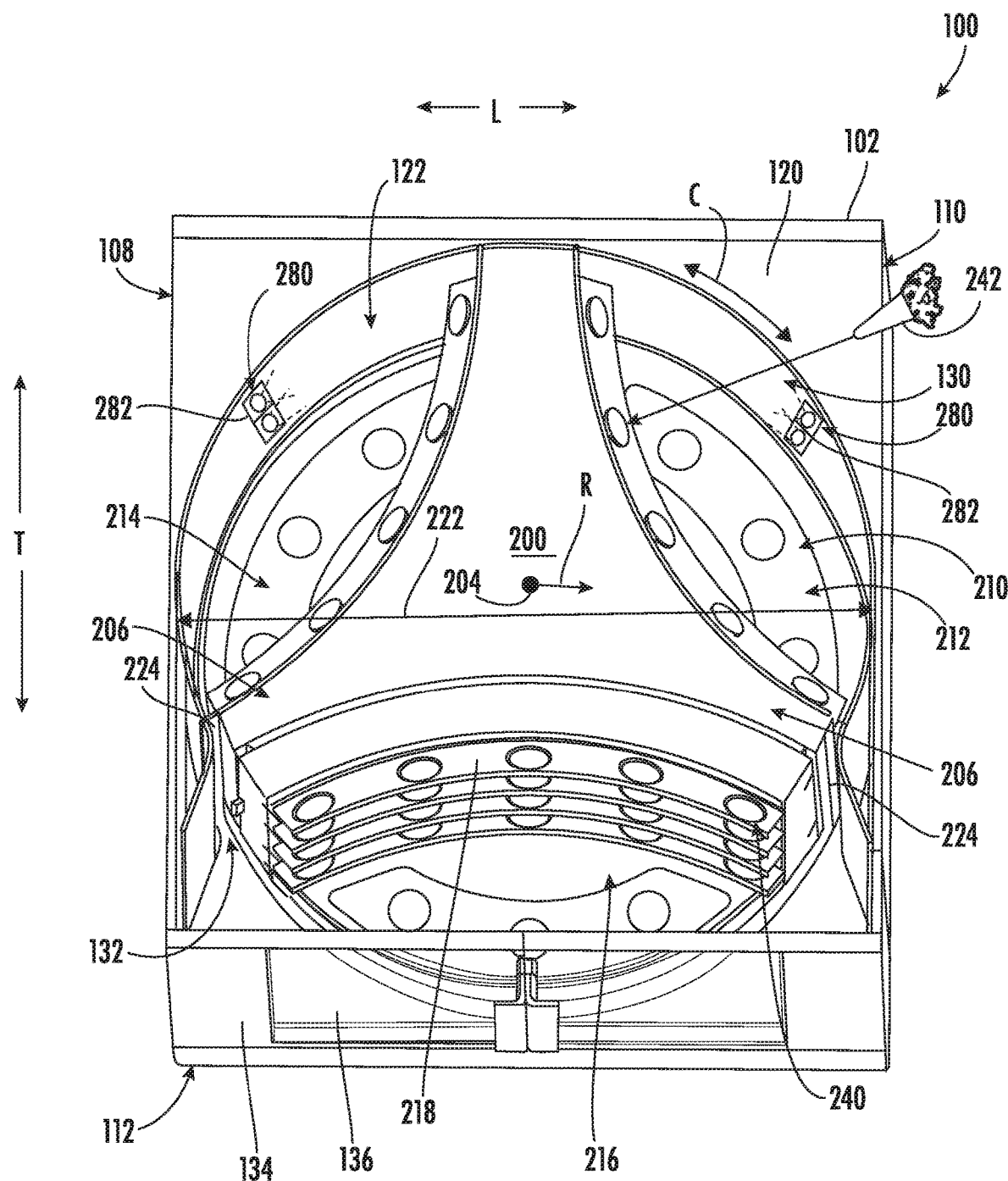
FIG. 4 is a top perspective view of the exemplary gardening appliance of FIG. 1, with the top panel of the cabinet removed to reveal a rotatable grow module according to an exemplary embodiment of the present subject matter.
Figure 5:
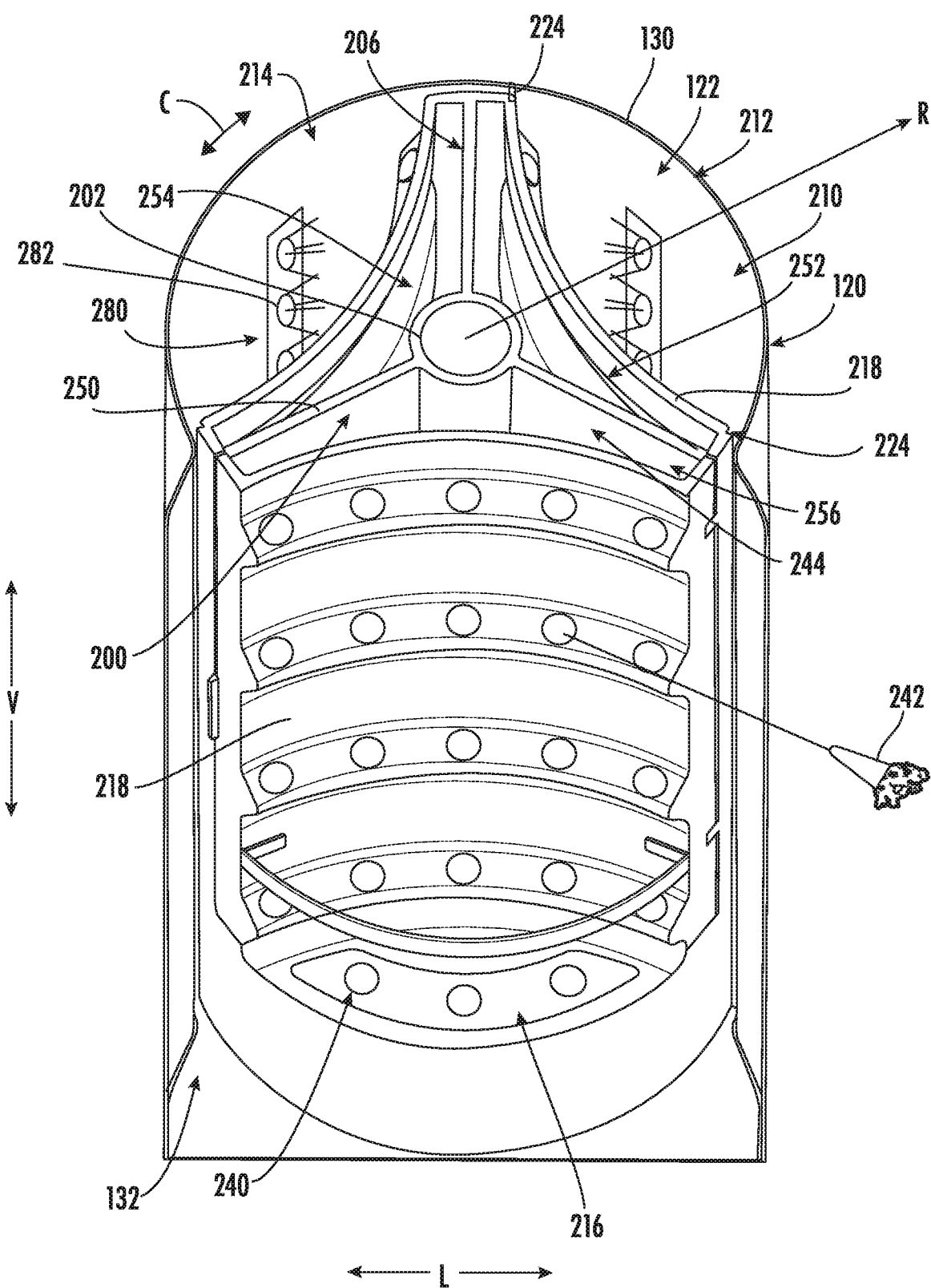
FIG. 5 provides a perspective cross sectional view of the exemplary gardening appliance of FIG. 1 according to another exemplary embodiment of the present subject matter.
Figure 6:
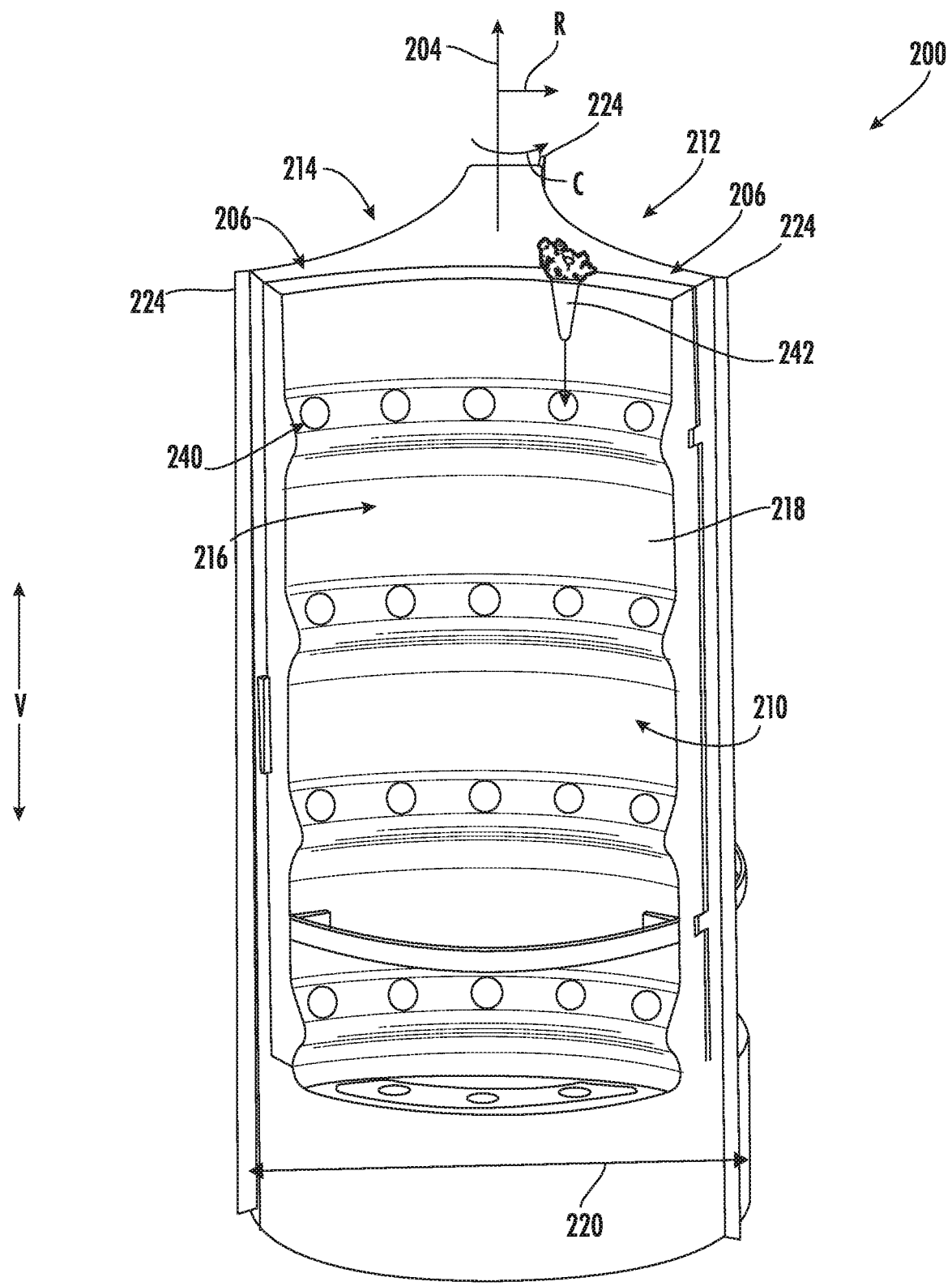
FIG. 6 provides a perspective view of the grow module of the exemplary gardening appliance of FIG. 1 according to another exemplary embodiment of the present subject matter.

For example, as illustrated in FIGS. 4 and 5, first chamber 212 and second chamber 214 are both in a sealed position, whereas third chamber 216 is in a display position. As motor 230 rotates grow module 200 by 120 degrees in the counterclockwise direction, second chamber 214 will enter the display position, while first chamber 212 and third chamber 216 will be in the sealed positions. Motor 230 may continue to rotate grow module 200 in such increments to cycle grow chambers 210 between these sealed and display positions.

Referring now generally to FIGS. 4 through 8, grow module 200 will be described in more detail according to an exemplary embodiment of the present subject matter. As shown, grow module 200 defines a plurality of apertures 240 which are generally configured for receiving plant pods 242 into an internal root chamber 244. Plant pods 242 generally contain seedlings or other material for growing plants positioned within a mesh or other support structure through which roots of plants 124 may grow within grow module 200. A user may insert a portion of plant pod 242 (e.g., a seed end or root end 246) having the desired seeds through one of the plurality of apertures 240 into root chamber 244. A plant end 248 of the plant pod 242 may remain within grow chamber 210 such that plants 124 may grow from grow module 200 such that they are accessible by a user. In this regard, grow module 200 defines root chamber 244, e.g., within at least one of central hub 202 and the plurality of partitions 206. As will be explained below, water and other nutrients may be supplied to the root end 246 of plant pods 242 within root chamber 244. Notably, apertures 240 may be covered by a flat flapper seal (not shown) to prevent water from escaping root chamber 244 when no plant pod 242 is installed.

Figure 7:
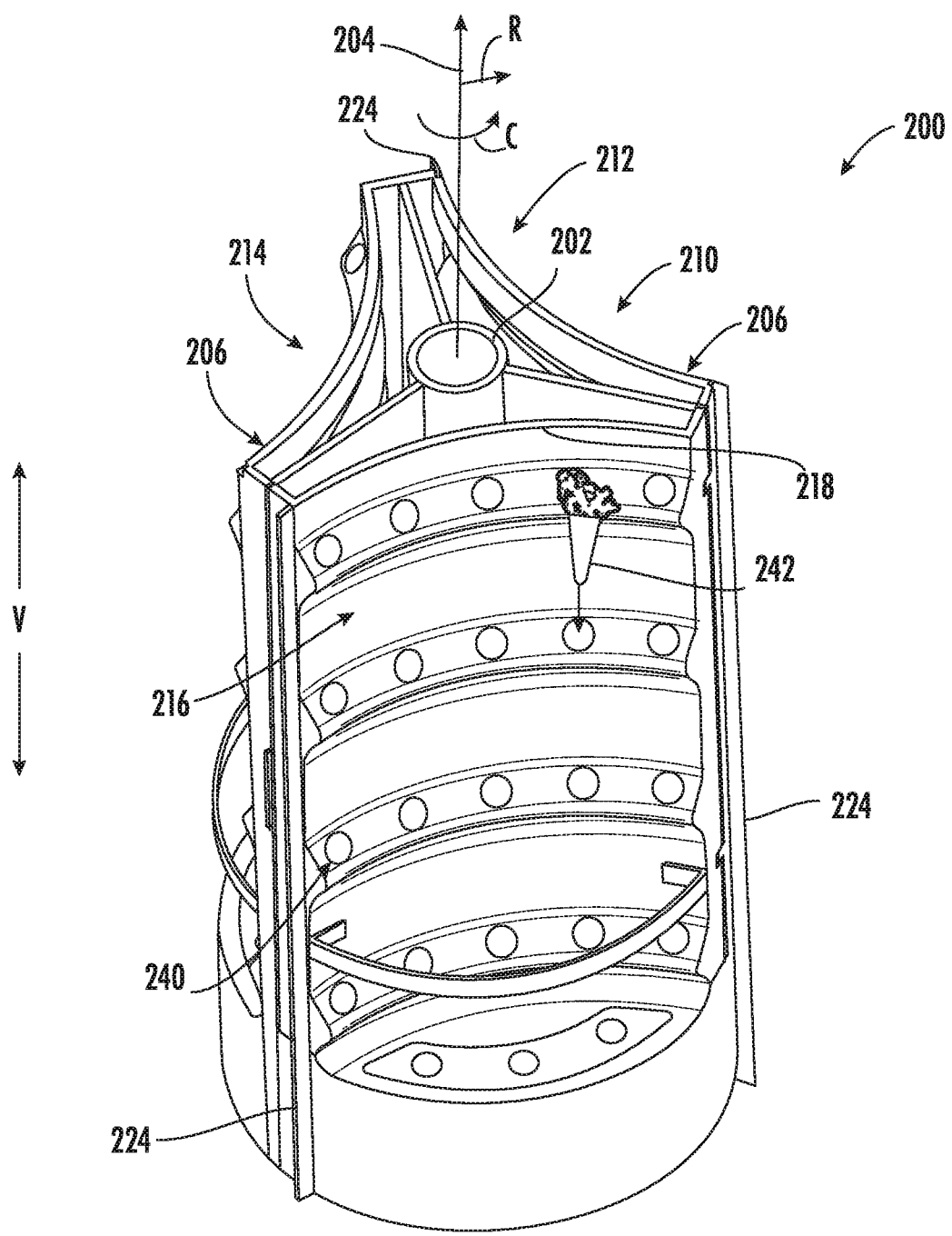
FIG. 7 provides a perspective cross sectional view of the exemplary grow module of FIG. 6 according to another exemplary embodiment of the present subject matter.
Figure 8:
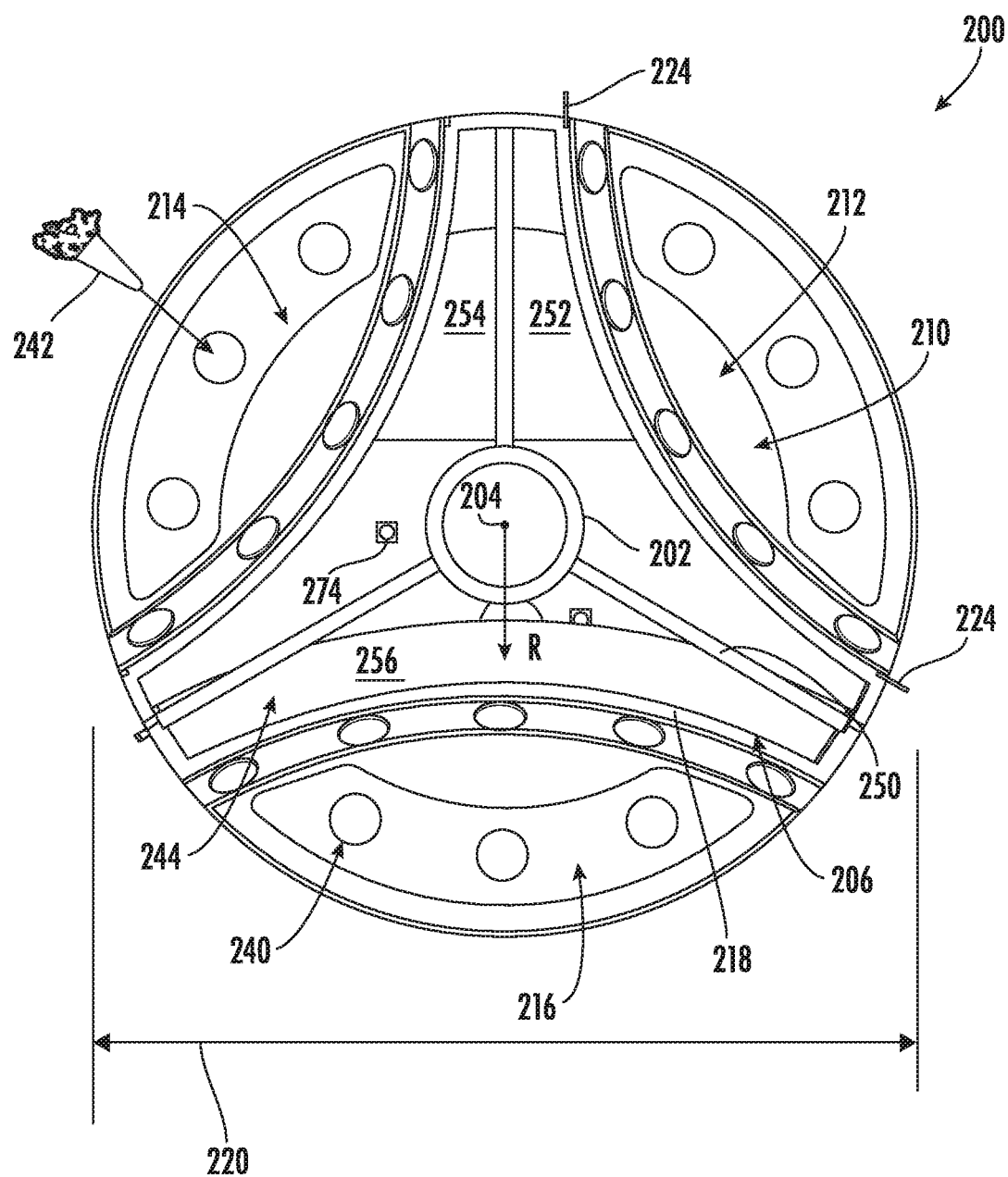
FIG. 8 provides a top cross-sectional view of the exemplary grow module of FIG. 6 according to another exemplary embodiment of the present subject matter.

As best shown in FIGS. 5 and 7, grow module 200 may further include an internal divider 250 that is positioned within root chamber 244 to divide root chamber 244 into a plurality of root chambers, each of the plurality of root chambers being in fluid communication with one of the plurality of grow chambers 210 through the plurality of apertures 240. More specifically, according to the illustrated embodiment, internal divider 250 may divide root chamber 244 into a first root chamber 252, a second root chamber 254, and a third root chamber 256. According to an exemplary embodiment, first root chamber 252 may provide water and nutrients to plants 124 positioned in the first grow chamber 212, second root chamber 254 may provide water and nutrients to plants 124 positioned in the second grow chamber 214, and third root chamber 256 may provide water and nutrients to plants 124 positioned in the third grow chamber 216. In this manner, environmental control system 148 may control the temperature and/or humidity of each of the plurality of chambers 212-216 and the plurality of root chambers 252-256 independently of each other.

Environmental control system 148 may further include a hydration system 270 which is generally configured for providing water to plants 124 to support their growth. Specifically, according to the illustrated embodiment, hydration system 270 generally includes a water supply 272 and misting device 274 (e.g., such as a fine mist spray nozzle or nozzles). For example, water supply 272 may be a reservoir containing water (e.g., distilled water) or may be a direct connection municipal water supply. Misting device 274 may be positioned at a bottom of root chamber 244 and may be configured for charging root chamber 244 with mist for hydrating the roots of plants 124. Alternatively, misting devices 274 may pass through central hub 204 along the vertical direction V and periodically include a nozzle for spraying a mist or water into root chamber 244. Because various plants 124 may require different amounts of water for desired growth, hydration system 270 may alternatively include a plurality of misting devices 274, e.g., all coupled to water supply 272, but being selectively operated to charge each of first root chamber 252, second root chamber 254, and third root chamber 256 independently of each other.

Notably, environmental control system 148 described above is generally configured for regulating the temperature and humidity (e.g., or some other suitable water level quantity or measurement) within one or all of the plurality of chambers 210 and/or root chambers 252-256 independently of each other. In this manner, a versatile and desirable growing environment may be obtained for each and every chamber 210.

Referring now for example to FIGS. 4 and 5, gardening appliance 100 may further include a light assembly 280 which is generally configured for providing light into selected grow chambers 210 to facilitate photosynthesis and growth of plants 124. As shown, light assembly 280 may include a plurality of light sources 282 stacked in an array, e.g., extending along the vertical direction V. For example, light sources 282 may be mounted directly to liner 120 within grow chamber 122, or may alternatively be positioned behind liner 120 such that light is projected through a transparent window or light pipe into grow chamber 122. The position, configuration, and type of light sources 282 described herein are not intended to limit the scope of the present subject matter in any manner.

Light sources 282 may be provided as any suitable number, type, position, and configuration of electrical light source(s), using any suitable light technology and illuminating in any suitable color. For example, according to the illustrated embodiment, light source 282 includes one or more light emitting diodes (LEDs), which may each illuminate in a single color (e.g., white LEDs), or which may each illuminate in multiple colors (e.g., multi-color or RGB LEDs) depending on the control signal from controller 174. However, it should be appreciated that according to alternative embodiments, light sources 282 may include any other suitable traditional light bulbs or sources, such as halogen bulbs, fluorescent bulbs, incandescent bulbs, glow bars, a fiber light source, etc.

According to an exemplary embodiment, light assembly 280 is positioned only within the enclosed back portion 130 of liner 120 such that only grow chambers 210 which are in a sealed position are exposed to light from light sources 282. Specifically, grow module 200 acts as a physical partition between light assemblies 280 and front display opening 132. In this manner, as illustrated in FIG. 5, no light may pass from first chamber 212 or second chamber 214 through grow module 200 and out front display opening 132. As grow module 200 rotates, two of the three grow chambers 210 will receive light from light assembly 280 at a time. According still other embodiments, a single light assembly may be used to reduce costs, whereby only a single grow chamber 210 will be lit at a single time.

Gardening appliance 100 and grow module 200 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow module 200 having two partitions 206 extending from opposite sides of central hub 202 to define a first grow chamber and a second grow chamber. According to such an embodiment, by rotating grow module 200 by 180 degrees about central axis 206, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow module 200 but may have a modified cabinet 102 such that front display opening 132 is wider and two of the three grow chambers 210 are displayed at a single time. Thus, first chamber 212 may be in the sealed position, while second chamber 214 and third chamber 216 may be in the display positions. As grow module 200 is rotated counterclockwise, first chamber 212 is moved into the display position and third chamber 216 is moved into the sealed position.

Figure 9:
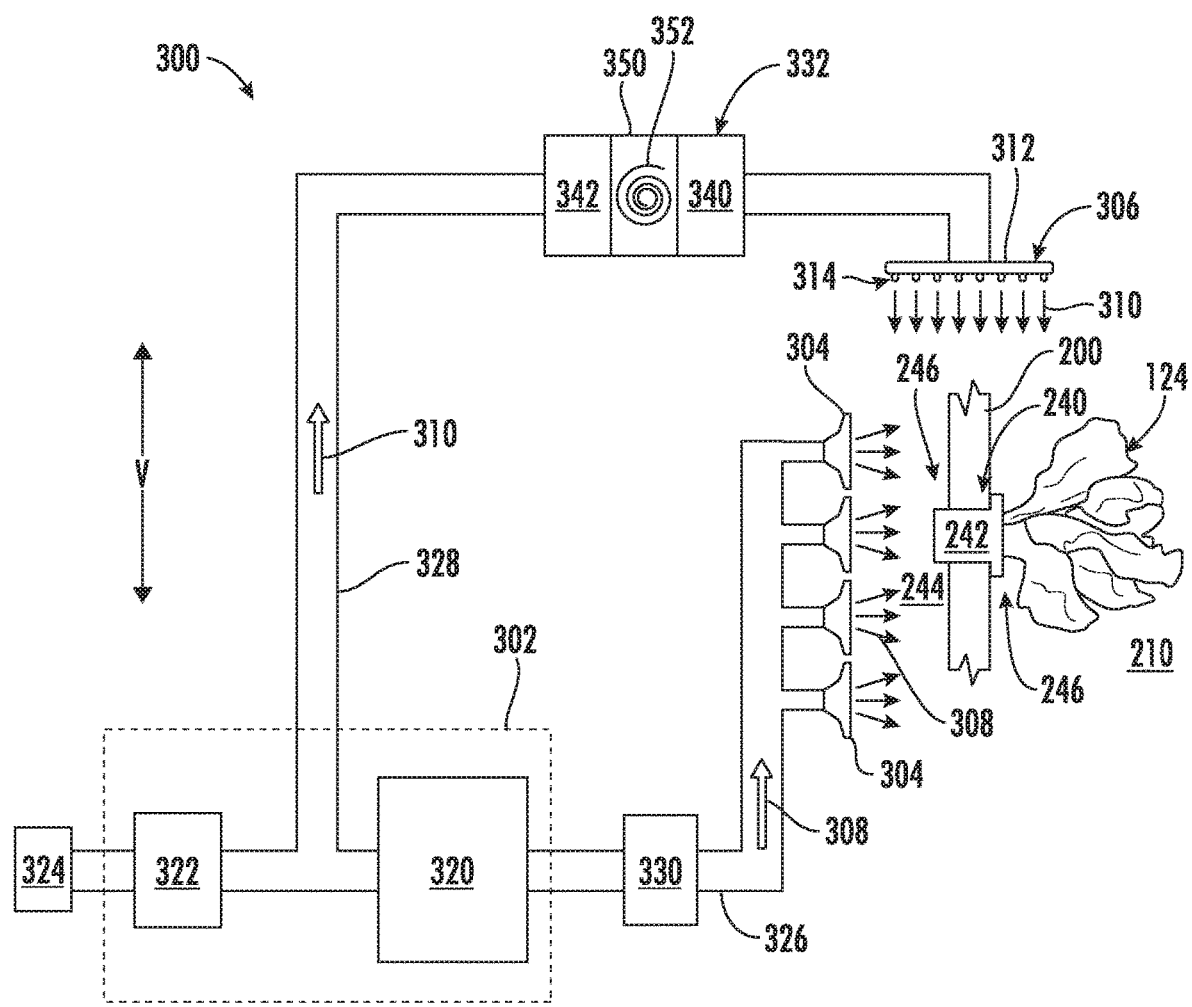
FIG. 9 provides a schematic view of a hydration system of the exemplary gardening appliance of FIG. 1 according to an exemplary embodiment of the present subject matter.
Figure 10:
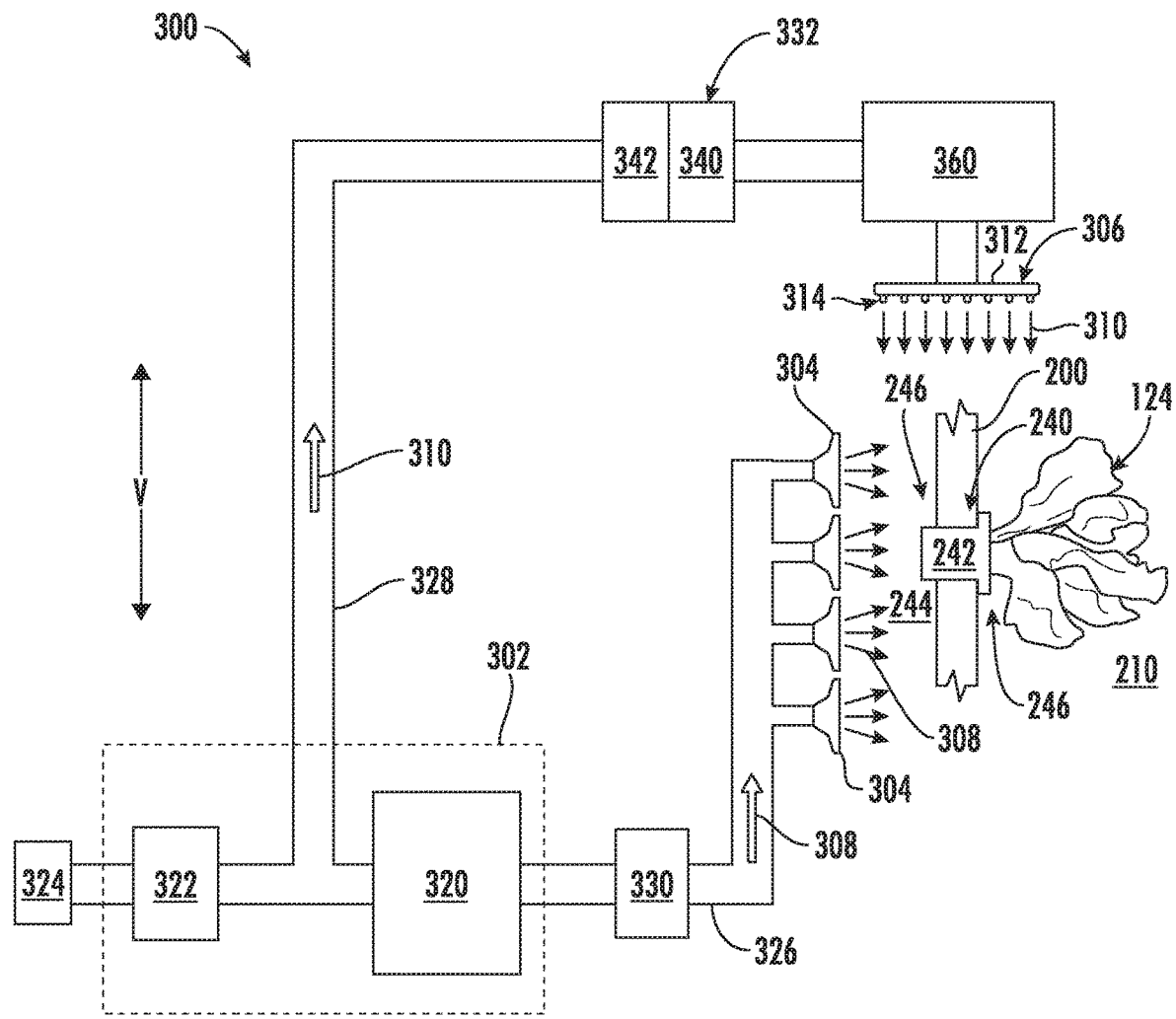
FIG. 10 provides a schematic view of a hydration system of the exemplary gardening appliance of FIG. 1 according to another exemplary embodiment of the present subject matter.

Referring now specifically to FIGS. 9 and 10, gardening appliance 100 may further include a hydration system 300 that is generally configured for hydrating plants 124 within gardening appliance 100 in the event of a power outage or another failure of the primary water supply system. In this regard, for example, hydration system 300 may be a part of or may entirely replace a hydration system 270 described above. Although an exemplary configuration and operation of hydration system 300 will be described below, it should be appreciated that variations and modifications may be made to such systems and methods while remaining within the scope of the present subject matter.

According to the illustrated embodiment, hydration system 300 includes a pressurized water supply 302 (described below) for providing a flow of water and/or other nutrients into grow chamber 210 and/or root chamber 244. Specifically, hydration system 300 further includes one or more primary nozzles 304 and one or more auxiliary nozzles 306 that are both in fluid communication with pressurized water supply 302. In this manner, pressurized water supply 302 may generally selectively provide a primary flow of water 308 through primary nozzles 304 and an auxiliary flow of water 310 through auxiliary nozzle 306. The primary flow of water 308 is generally used to hydrate plans 124 under normal operating conditions, e.g., when gardening appliance 100 is supplied with electrical power. By contrast, the auxiliary flow of water 310 is generally used as an emergency hydration source, e.g., to sustain plants 124 in situations where there is a power outage preventing normal operation of gardening appliance 100 or there is another issue preventing the primary flow of water 308.

As illustrated, primary nozzle 304 includes a plurality of nozzles positioned within root chamber 244 for hydrating root ends 246 of plant pods 242. Specifically, as described in more detail below, pressurized water supply 302 may include a pump assembly or municipal pressurized water supply for urging a relatively high pressure and high-volume flow of primary water 308 onto plants 124 according to a predetermined hydration schedule. According to an exemplary embodiment, primary nozzle 304 may be a part of or replace a hydration system 270 as illustrated in FIGS. 1 through 8. In this regard, primary nozzle 304 may be equivalent to misting device 274 or may be used in addition to misting device 274. Although one exemplary configuration of primary nozzle 304 is described herein, it should be appreciated that primary nozzle 304 may include any other suitable number, type, configuration, and position of devices for supplying water, hydration, or other nutrients to plants 124.

According to the illustrated exemplary embodiment, auxiliary nozzle 306 is a drip line or a drip track. In this regard, auxiliary nozzle 306 includes an elongated manifold 312 defining a plurality of discharge orifices 314. When the auxiliary flow of water 310 is provided to auxiliary nozzle 306, the auxiliary flow of water 310 may drip at a relatively low flow rate out of orifices 314 to hydrate plants 124. According to the illustrated embodiment, auxiliary nozzle 306 is positioned above grow module 200 along the vertical direction V and extends within both grow chamber 210 and root chamber 244 for hydrating plants 124. However, according to alternative embodiments, auxiliary nozzle 306 may be positioned at any other suitable location, may have any other suitable type, size, or number of nozzles, and may be provide an auxiliary flow of water from any other suitable source.

Notably, because auxiliary nozzle 306 is generally used to hydrate plants 124 under emergency conditions when there is a limited supply of water and no operating pump to pressurize additional water, auxiliary nozzle 306 is generally configured for providing the flow of auxiliary water 310 at a lower, more restricted flow rate than the primary flow of water 308 through primary nozzle 304. For example, according to exemplary embodiments, the flow rate of the primary flow of water 308 may be greater than or about 10 times the flow rate of the auxiliary flow of water 310. According to other embodiments, the primary flow rate of water 308 may be between about 1 and 500 times, between about 5 and 100 times, or between about 8 and 50 times the flow rate of the auxiliary flow of water 310. Other suitable orifice sizes, number of nozzles, and other water distribution features may be used to adjust the total flow rates, dispensing positions, and spray patterns of flows of water 308, 310.

According to the embodiment illustrated in FIG. 9, pressurized water supply 302 includes an accumulator 320 that is generally configured for receiving and storing pressurized water. In this regard, the term "accumulator" may generally be used to refer to any suitable device for receiving, storing, and distributing pressurized water. For example, accumulator 320 may be a sealed container containing an air bladder that is compressed as pressurized water is supplied into accumulator 320. The air within the air bladder may be compressed to maintain the pressure of the water within accumulator 320 and may expand to discharge water when the supply line is no longer pressurized. It should be appreciated that other means for maintaining the hydraulic pressure within accumulator 320 (or pressurized water supply 302) may be used while remaining within the scope of the present subject matter.

Pressurized water supply 302 further includes a pump assembly 322 that is fluidly coupled to a water supply 324 and is configured for providing a flow of pressurized water into accumulator 320. Thus, under normal operation, power is supplied to gardening appliance 100 (and thus to pump assembly 322), such that pump assembly 322 provides a flow of pressurized water into the accumulator 320, where it is distributed as the primary flow of water 308 through a primary supply line 326 toward primary nozzle 304. Under such operating conditions, accumulator 320 may operate to absorb hydraulic disturbances and maintain a substantially constant pressure and flow rate for primary flow of water 308.

In the event of a power outage, pump assembly 322 may no longer operate, but accumulator 320 may still store pressurized water. It may be undesirable to supply the remaining pressurized water through primary supply line 326 due to the high flow rates of primary nozzle 304. In this regard, the remaining pressurized water will be quickly expended and plants 124 may die during a prolonged power outage. In order to hydrate plants 124 during a longer power outage, hydration system 300 may further include an auxiliary supply line 328 that is fluidly coupled to auxiliary nozzle 306 for slowly but continuously providing a flow of water onto plants 124 to maintain their health during a prolonged outage. Notably, because the flow rate through auxiliary nozzle 306 is less than through primary nozzle 304, plants 124 may receive prolonged or sustained hydration.

According to an exemplary embodiment, water supply 324 may be a municipal water supply that provides a flow of pressurized water. Thus, according to exemplary embodiments, pump assembly 322 may be removed altogether and hydration system 300 may be operate strictly off the pressure supplied from the municipal water supply. According to still other embodiments, hydration system 300 may include any other suitable sources of pressurized water for supplying auxiliary nozzle 306 during a power outage. For example, hydration system 300 may include one or more additional pressurized water tanks that are pressurized during normal operation so that they may discharge water during a power outage.

According to exemplary embodiments of the present subject matter, hydration system 300 may further include a plurality of valves and valve assemblies for regulating the primary flow of water 308 and/or the auxiliary flow of water 310. Specifically, according to the illustrated embodiment, hydration system 300 may include a primary valve assembly 330 that is operably coupled to primary nozzle 304 for selectively directing or permitting the primary flow of water 308 from pressurized water supply 302 onto the plant pods 242. Specifically, primary valve assembly 330 typically operates according to a normal hydration schedule when power is being supplied to gardening appliance 100. According to exemplary embodiments, in the event of a power outage, primary valve assembly 330 may be configured to close off primary nozzle 304 such that the primary flow of water 308 is stopped. In this manner, the limited pressurized water storage within accumulator 320 is not quickly expended.

Hydration system 300 further includes an auxiliary valve assembly 332 that is operably coupled to auxiliary nozzle 306 for selectively directing the auxiliary flow of water 310 from pressurized water supply 302 onto plant pods 242 when power is lost to gardening appliance 100 or when pump assembly 322 otherwise fail to provide sufficiently pressurized water to maintain plant hydration. In this manner, under normal operation when gardening appliance 100 is provided with power, primary valve assembly 330 may operate to selectively hydrate plants 124 while auxiliary valve assembly 332 remains closed to prevent the auxiliary flow of water 310. By contrast, when there is a power outage or another system failure which prevents the primary flow of water 308, primary valve assembly 330 may operate to close primary nozzle 304 and auxiliary valve assembly 332 may selectively open auxiliary nozzle 306 to permit the auxiliary flow of water 310 onto plant pods 242.

Referring now specifically to FIG. 9, auxiliary valve assembly 332 may include an auxiliary valve 340 that is fluidly coupled to auxiliary supply line 328 or directly to auxiliary nozzle 306 and is configured for regulating the flow of auxiliary water 310. In addition, auxiliary valve assembly 332 may include a solenoid 342 that is operably coupled to auxiliary valve 340 and is generally configured for opening, closing, or otherwise positioning auxiliary valve 340 to regulate the auxiliary flow of water 310. Specifically, according to an exemplary embodiment, solenoid 342 is configured for opening auxiliary valve 340 when power is lost to gardening appliance 100. In this regard, solenoid 342 may be a normally open solenoid that remains in the closed position while power is supplied to gardening appliance 100, but which opens when the power fails. For example, if power is lost, primary valve assembly 330 may stop the primary flow of water 308 and solenoid 342 may open auxiliary valve 340 to slowly permit the remaining pressurized water to seep or drip onto plants 124. In this manner, plants 124 may be hydrated for a prolonged duration even after the power supply failure.

Referring still to FIG. 9, auxiliary valve assembly 332 may further include a timer 350 that is operably coupled to auxiliary valve 340. According to exemplary embodiments, the timer 350 is configured for periodically opening auxiliary valve 340 when triggered. In this regard, timer 350 may regulate the operation of auxiliary valve 340 to prolong the hydration of plants 124 over a long power outage. According to an exemplary embodiment, timer 350 is a mechanical timer (e.g., like an egg timer) and includes a spring 352 that is wound when power is supplied to gardening appliance 100 and that begins to slowly unwind when power is removed from the gardening appliance 100. It should be appreciated that any other suitable timing mechanism may be used while remaining within the scope of the present subject matter. For example, a digital timer operating on a battery backup may be used to regulate the periodic operation of solenoid 342. In addition, it should be appreciated that the auxiliary supply schedule at which auxiliary valve 340 is opened may vary to provide different flow rates of the auxiliary flow of water 310 at various times and under various conditions.

Referring now to FIG. 10, another configuration of hydration system 300 will be described according to an exemplary embodiment of the present subject matter. In general, the hydration system 300 in FIG. 20 is similar to that shown in FIG. 9, except that it is a passive system which does not require a timer 350 to provide hydration upon power failure. In this regard, hydration system 300 may further include a secondary tank 360 that is in fluid communication with pressurized water supply 302 for receiving and storing the auxiliary flow of water 310 when gardening appliance 100 experiences a power outage.

In this manner, according to an exemplary embodiment, auxiliary valve assembly 332 may remain closed and secondary tank 360 may remain empty during normal operation of gardening appliance 100. However, in the event of a power outage, auxiliary valve assembly 332 may open to permit the flow of auxiliary water 310 to pass into secondary tank 360. In this regard, accumulator 320 may expand and urge the auxiliary flow of water 310 into secondary tank 360 where it may slowly and passively drip through auxiliary nozzle 306 onto plants 124. According still other embodiments, an additional solenoid valve may be operably coupled to an outlet of secondary tank 360 to prevent the flow of auxiliary water 310 from exiting until desired or may otherwise relate flow at a desirable flow rate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance, comprising:
   a liner positioned within a cabinet and defining a grow chamber;
   a grow module mounted within the liner and defining a root chamber;
   a plurality of apertures defined through the grow module for receiving one or more plant pods that extend into the root chamber;
   a hydration system comprising:
      a pressurized water supply;
      a primary nozzle in fluid communication with the pressurized water supply; and
      a primary valve assembly operably coupled to the primary nozzle for selectively directing a primary flow of water from the pressurized water supply onto the plant pods when the power is being supplied to the gardening appliance;
      an auxiliary nozzle in fluid communication with the pressurized water supply; and
      an auxiliary valve assembly operably coupled to the auxiliary nozzle, the auxiliary valve assembly comprising an auxiliary valve for selectively directing an auxiliary flow of water from the pressurized water supply to the auxiliary nozzle and onto the plant pods when power is lost to the gardening appliance.

2. The gardening appliance of claim 1, wherein the pressurized water supply comprises an accumulator.

3. The gardening appliance of claim 2, wherein the hydration system further comprises:
   a pump assembly for pressurizing water within the accumulator when the power is supplied to the gardening appliance.

4. The gardening appliance of claim 1, wherein the hydration system further comprises:
   a secondary tank in fluid communication with the pressurized water supply for receiving and storing the auxiliary flow of water when power is supplied to the gardening appliance.

5. The gardening appliance of claim 1, wherein a flow rate of the primary flow of water is greater than ten times a flow rate of the auxiliary flow of water.

6. The gardening appliance of claim 1, wherein the auxiliary valve assembly comprises:
   a solenoid operably coupled to the auxiliary valve, the solenoid being configured for opening the auxiliary valve when the power is lost to the gardening appliance.

7. The gardening appliance of claim 1, wherein the auxiliary valve assembly comprises:
   a timer operably coupled to the auxiliary valve, the timer being configured for periodically opening the auxiliary valve when triggered; and a solenoid operably coupled to the timer, the solenoid being configured for triggering the timer when the power is lost to the gardening appliance.

8. The gardening appliance of claim 7, wherein the timer is a mechanical timer.

9. The gardening appliance of claim 7, wherein the timer comprises a spring that is wound when the power is supplied to the gardening appliance and begins to unwind when the power is removed from the gardening appliance.

10. The gardening appliance of claim 7, wherein the solenoid is a normally open solenoid valve.

11. The gardening appliance of claim 1, wherein the auxiliary nozzle is positioned within the root chamber above the plurality of plant pods along a vertical direction.

12. The gardening appliance of claim 1, wherein the auxiliary nozzle comprises a plurality of orifices positioned along a drip track.

13. The gardening appliance of claim 1, wherein the pressurized water supply comprises a municipal water supply.

14. A hydration system for a gardening appliance, the gardening appliance comprising a grow module defining a plurality of apertures for receiving plant pods, the hydration system comprising:
  a pressurized water supply;
  a primary nozzle in fluid communication with the pressurized water supply; and
  a primary valve assembly operably coupled to the primary nozzle for selectively directing a primary flow of water from the pressurized water supply onto the plant pods when the power is being supplied to the gardening appliance;
  an auxiliary nozzle in fluid communication with the pressurized water supply; and
  an auxiliary valve assembly operably coupled to the auxiliary nozzle, the auxiliary valve assembly comprising an auxiliary valve for selectively directing an auxiliary flow of water from the pressurized water supply to the auxiliary nozzle and onto the plant pods when power is lost to the gardening appliance.

15. The hydration system of claim 14, wherein the pressurized water supply comprises:
  an accumulator; and
  a pump assembly for pressurizing water within the accumulator when the power is supplied to the gardening appliance.

16. The hydration system of claim 14, further comprising:
  a secondary tank in fluid communication with the pressurized water supply for receiving and storing the auxiliary flow of water when power is supplied to the gardening appliance.

17. The hydration system of claim 14, wherein the auxiliary valve assembly comprises:
  a solenoid operably coupled to the auxiliary valve, the solenoid being configured for opening the auxiliary valve when the power is lost to the gardening appliance.

18. The hydration system of claim 15, wherein the auxiliary valve assembly comprises:
  a timer operably coupled to the auxiliary valve, the timer being configured for periodically opening the auxiliary valve when triggered; and
  a solenoid operably coupled to the timer, the solenoid being configured for triggering the timer when the power is lost to the gardening appliance.

19. The hydration system of claim 18, wherein the timer is a mechanical timer comprising a spring that is wound when the power is supplied to the gardening appliance and begins to unwind when the power is removed from the gardening appliance.

* * * * *